Aug. 4, 1936.    H. P. STEVENS    2,049,828
TREATMENT OF LATEX
Filed Dec. 12, 1934
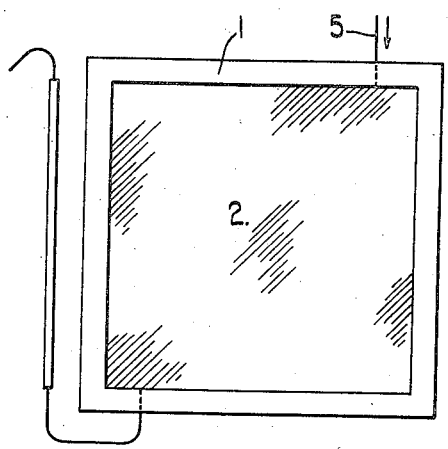
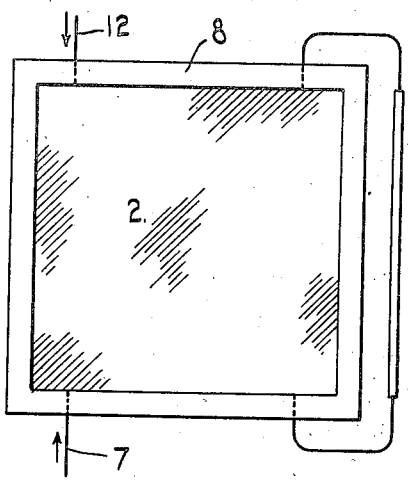
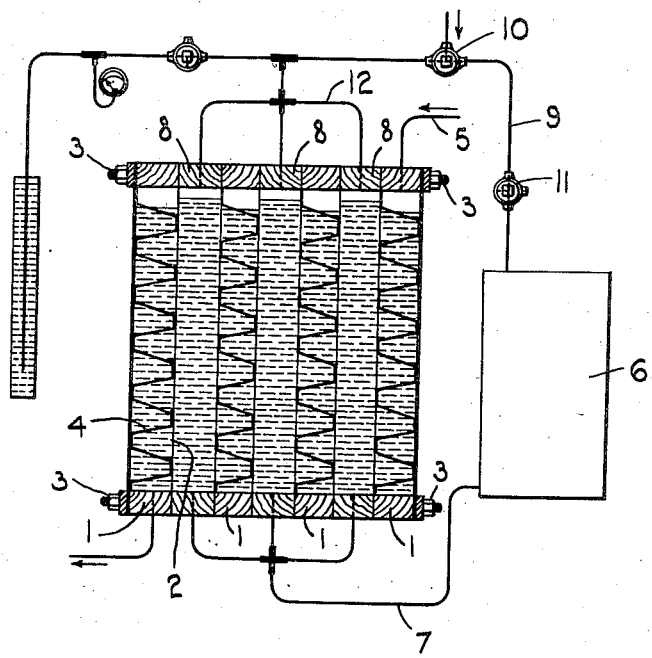
Inventor
Henry P. Stevens
by Ernest F. Mechlin
His Attorney Patented Aug. 4, 1936

2,049,828

UNITED STATES PATENT OFFICE 2,049,828

TREATMENT OF LATEX

Henry Potter Stevens, London, England, assignor to Rubber Producers Research Association, London, England Application December 12, 1934, Serial No. 757,212
In Great Britain December 18, 1933

8 Claims. (Cl. 18—50)

This invention relates to the purification of rubber latex and has more especial reference to processes for the purification and simultaneous or subsequent concentration of rubber latex.

The latex of rubber-bearing trees is known to consists in the main of rubber or other gums, resins, proteins, and similar substances as a suspension in an aqueous serum carrying carbohydrates, salts and other substances which are water soluble and therefore held in solution in the latex.

In order to utilize this latex to the best advantage, it is desirable, and in some cases essential, to remove part of the aqueous content, thereby obtaining a more concentrated suspension or dispersion of the rubber or other colloidal constituents. For other purposes, it is also desirable or essential to remove the water soluble or crystalloid constituents, and thereby to purify the latex.

According to the present invention, the latex is purified by a dialyzing treatment, the carbohydrates, salts and other crystalloid impurities including hydrolyzed protein, if present, held in solution passing through the membrane, while the colloidal rubber particles do not pass, hydrostatic pressure being exerted on the body of the latex to promote dialysis by movement of the latex and simultaneously to retard or reverse the normal dilution which would otherwise occur during dialysis.

The dialysis may be effected with water on the opposite side of the membrane through which diffusion of the water soluble non-caoutchouc constituents of the latex takes place. By appropriate control of the working conditions, e. g. the kind and thickness of membrane, the relative volumes of rubber latex and of water, the depth or thickness of the latex layer, the temperature, the pressure and the movement of the latex and of water, control can be exerted on the rate and extent of purification.

The preferred process according to the invention includes two stages, the first effecting purification of the latex by dialysis either with or without partial concentration and the second stage the concentration of the thus purified latex by any usual or appropriate treatment such as centrifugation, creaming or evaporation.

The invention, however, also comprehends an improved method of concentrating latex, wherein concentration proceeds concurrently or consecutively with purification as one uninterrupted process.

In effecting a practically useful degree of purification an appreciable dilution of the latex occurs by the entry of water under the influence of osmotic forces, unless these forces are opposed either by excess hydrostatic pressure on the latex side of the diaphragm or by the utilization, instead of water, on the side opposed to the latex, of appropriate aqueous solutions such as solutions of ammonium soaps which exert an osmotic force opposed to that of the latex, or by both these methods in conjunction. By such methods it has been found that dilution can not only be retarded but that the flow of diluent can be reversed and concentration of the latex thereby effected.

With the methods of concentration hitherto exploited, the water soluble impurities or a portion thereof are retained with the concentrate, but this disadvantage does not apply to the latex concentrated after purification in accordance with the present invention, since the purification can be continued to any desired extent and the concentration carried out to any desired degree, for instance to yield a fluid concentrate with a dry rubber content of 60% to 65% or a paste with a rubber content of 80% to 85%. Similarly, where the processes are arranged to effect concentration either wholly or in part simultaneously with purification, the water soluble impurities are removed from the concentrate and the disadvantage hitherto experienced is obviated.

As compared with the particles of many colloidal substances which can be separated by dialysis, the rubber particles are relatively coarse so that the separation and consequent purification proceeds with ease, although, since dialysis is a relatively slow operation and the ammonia usually added to the latex as a preservative or stabilizer is a crystalloid substance which will therefore pass through the membrane with the water soluble impurities, it may be desirable to renew the ammonia content by further additions. The loss of the ammonia during dialysis does not necessarily lead to premature coagulation of the latex, however, probably because the impurities which pass through the membrane and are thus separated are also those which normally cause fermentation or putrefaction or promote the formation of acidic substances, any of which occurrences renders the latex unstable and prone to coagulate. It will be appreciated that as the purification according to the invention proceeds and such detrimentally active materials are removed, the liability of the latex to be unstable is lessened, but since it is very often desirable to ensure the stability of the latex during the subsequent concentration, it may be advisable to add a small quantity amounting to about .5% of ammonia which addition may, where desired, be made during the course of the dialyzing treatment.

Reference will now be had to the accompanying drawing, which illustrates diagrammatically apparatus suitable for carrying out the process according to the invention, and in which,—

Fig. 1 is a diagrammatic illustration of a water cell, and Fig. 2 a similar illustration of a latex cell, Fig. 3 showing a plurality of water and latex cells assembled alternately in series with the connections by which latex is fed to the alternate cells and maintained therein under pressure.

Each dialyzer cell consists of a hollow square frame 1, conveniently of wood, bounded on either square face by a sheet of dialyzing membrane 2, numbers of these cells being assembled to form a working unit as shown in Fig. 3 and being held together by clamps or bolts 3.

The thickness of the cells may conveniently be from ½" to 1", and it will be appreciated that the apparatus may be suited to the treatment of small or large quantities of latex by a simple reduction or multiplication of the dialyzer cells.

Alternate cells are charged with latex and the intermediate cells with water, and the latter contain a woven wire mat 4 or other form of spacer to prevent collapse on to one another of the opposed membranes or diaphragms which form the walls of the cells.

The latex cells have no spacers as they are continuously held at a pressure greater than atmosphere plus the water head in the water cells, the apparatus being closely similar to one form used in the recovery of caustic soda from alkali-cellulose liquor in the artificial silk trade, but having the addition of means by which air pressure may be applied to the latex cells mainly to hasten dialysis and retard dilution but also to move the latex from the cells to the storage tank, and if desired to move the latex from cell to cell in order to promote the dialysis.

The apparatus is also furnished with means for feeding in and discharging the latex and water to and from their respective cells, the water being renewed as often as desired during the treatment of one batch of latex through a pipe 5 connected to a suitable source of supply.

6 is a tank containing the bulk of the latex to be treated and is connected through a pipe system 7 to the latex cells designated 8. On the other hand the tank 6 is connected through a pipe system 9 and suitable valves 10 and 11 with a source of air under pressure so that the latex cells 8 may be re-charged as requisite.

Valve 10 is also operable to admit air under pressure directly to the latex cells through a pipe system 12 to prevent dilution of the latex under treatment by water passing inversely through the membranes 2.

The following example indicates the degree of purification achieved when employing three square feet of vegetable parchment paper as dialyzing membrane per gallon of latex under treatment, as also the degree to which subsequent concentration can be safely taken. In the second stage of the treatment, i. e. during concentration, the purified latex is preferably rendered stable or resistant to spontaneous coagulation by the addition of 0.5% of ammonium stearate on the rubber content together with an excess of free ammonia, the concentration being conveniently effected by heating at about 65° to 70° C. with constant renewal of the surface by stirring. The following are the figures obtained and clearly show the extent of purification and subsequent concentration.

| | Per 100 parts by weight of latex (coagulable caoutchouc) | Total solids | Percent excess of total solids over caoutchouc |
|---|---|---|---|
| Original latex | 37.8 | 41.2 | 9.0 |
| Purified latex | 37.2 | 37.7 | 1.3 |
| Purified and then concentrated latex | 55.2 | 56.0 | 1.4 |

During the dialyzing treatment forming the first stage of the process by which the above results were achieved a pressure of 1¾ to 2 lbs. per square inch in excess of atmospheric pressure was maintained in the latex cells, while the water in the cells was open to atmosphere. Ordinary room temperature obtained.

The dialysis may, however, be carried out at any convenient temperature within the range over which coagulation of the latex does not take place. With other conditions similar there is an increase in the amount of dialyzate obtained in the first 20 or 24 hours of about 3% per 5.0° C. rise of temperature over the range 20° to 50° C.

The preferred membrane is a vegetable parchment paper and although animal membranes, e. g. gold beaters' skins, may be used with high efficiency, the assembly of such material in large sheets suited to the working conditions and the high cost, render their use expensive. Alternatively, closely woven cloths may be used and may be padded or treated with film forming substances such as cellulose derivatives, rubber or the like. In practice, however, parchment paper varying from 60 to 120 grams per square meter in weight have been found very suitable.

For latices containing dialysis-resistant non-caoutchouc constituents, the dialysis may be preceded by treatment promoting a process of hydrolysis of such constituents, e. g. by warming with or merely storing for a time with alkali or by the addition of a suitable enzyme whereby such constituents are broken down into dialyzable bodies and thus facilitate and further the subsequent process of purification.

The following example will indicate the advantage accruing from the use of pressure on the latex to assist the process of purification, a latex dialyzed through vegetable parchment paper for 20 hours at 20° to 23° C. yielding the following results.

| Condition | Grams dialyzate per 100 of latex | Gain or loss of water in grams per 100 of latex |
|---|---|---|
| No pressure | 2.08 | +75 |
| 1.25 lbs. sq. inch pressure | 2.60 | −28 |

It will be seen that in addition to substantial concentration of the latex simultaneously with purification, the pressure on the latex has also had the effect of increasing the mass of crystalloid impurities expelled from the latex, thus enhancing the degree of purification.

Initially there may be some dilution of the latex but as the dialysis proceeds even light pressures on the latex are sufficient to cause a flow of water against the osmotic pressure and in the same direction as the crystalloid substances, the following increase having been obtained with a layer of latex 6 to 7 m.ms. deep at 50° C. and under a pressure of about 1¼ lbs. per square inch.

| Hours from start | Water entering or leaving 100 grams latex |
|---|---|
| 3 | +1.2 |
| 6 | −0.6 |
| 15 | −23.0 |
| 19 | −26.5 |
| 25 | −36.0 |

The final figure represents an increase in concentration from the original 37.5% to about 58.5% dry rubber content.

By ascertaining the difference between the total solids and the coagulable caoutchouc obtainable from the latex before and after purification-concentration, an indication of the degree of purification can be had, a typical latex treated by the process to increase the rubber content from 37.5 to 48.9% showing a 6.8% excess of total solids before treatment and only a 0.4% excess after treatment, these figures indicating a purification corresponding to the removal of about 94% of the total water soluble non-caoutchouc substances.

As another example of the degree of purification and an indication of the chemical character of the impurities removed the following results of the dialysis of a normal ammonia preserved latex under pressure are cited, giving first the coagulable and total solid contents of the latex before and after treatment and then the percentages of chemically combined nitrogen in the raw material and in the products.

| | Per 100 grams latex | | Excess of total solids over caoutchouc as percent of caoutchouc |
|---|---|---|---|
| | Coagulable caoutchouc | Total solids | |
| Before dialysis | 36.2 | 40.6 | 12.2 |
| After dialysis | 37.7 | 38.1 | 1.06 |

This proves that 91% of the non-coagulable constituents were removed.

*Nitrogen content*

| Material | Nitrogen per 100 grams of material |
|---|---|
| Coagulable caoutchouc from undialyzed latex | 0.33 |
| Total solids from undialyzed latex | 0.60 |
| Total solids from dialyzed latex | 0.36 |

In the coagulation of the caoutchouc and in the dialysis, material containing 0.27% nitrogen and 0.24% respectively have been separated from the rubber, the dialysis in this instance removing 89% of the quantity removed by coagulation. It will be seen that the degree of purification as tested by the percentage removal of non-coagulable nitrogen i. e. 89%, is very close to the degree of purification as measured by the removal of total non-coagulable dissolved solids, i. e. 91%.

In another example the nitrogen content of the dry dialyzate itself was determined and was found to be 2.3% corresponding to the presence, in the dialyzate of 12% to 14% of hydrolytic products from proteins.

These are examples of the degree and nature of the purification effected on normal ammonia preserved latex, not treated before dialysis to produce any proteolytic product. But the process may be varied by such pre-treatment and by so doing reduce the amount of coagulable non-caoutchouc constituents, with corresponding increase in dialyzable matter and degree of purification of the caoutchouc.

A preliminary concentration of the latex may be effected before the purification and concentration according to the invention, such preliminary concentration having the effect of augmenting the relative crystalloid content and being adopted, with advantage, where it is desired to use a stabilizer, e. g. excess of fixed alkali during concentration, and to remove same during the dialyzing treatment.

Protective colloids may supplement or replace the ammonia addition to assure the resistance of the latex against coagulation where it is concentrated by a subsequent treatment, the choice and quantity of the stabilizer being dependent on the particular process of concentration adopted.

What I claim is:—

1. A process for the purification of rubber latex consisting in removing by dialysis with water or with an aqueous solution carbohydrates, salts or other crystalloid impurities held in solution and in exerting hydrostatic pressure on the body of the latex to promote dialysis by movement of the latex and simultaneously to retard or reverse the dilution normally occurring during dialysis.

2. A process for the purification of rubber latex consisting in removing carbohydrates, salts and other crystalloid impurities held in solution by dialysis with an aqueous solution exerting an osmotic force opposed to that of the latex and thereby retarding dilution of the latex during the treatment.

3. A process for the purification of rubber latex according to claim 2, wherein the latex is dialyzed with an ammonium soap solution.

4. A process for the purification of rubber latex consisting in removing carbohydrates, salts and other crystalloid impurities held in solution by dialysis with water or with an aqueous solution, the temperature being maintained in the neighbourhood of 50° throughout the treatment thereby to accelerate dialysis.

5. A continuous process for the purification and simultaneous concentration of rubber latex according to claim 1, wherein the body of the latex is supplied in parts to alternate dialyzer cells under pressure and wherein intermediate cells contain water or an aqueous solution for the receipt of dialyzate, the intermediate cells being replenishable as required.

6. A process for the treatment of rubber latex according to claim 1, consisting in preceding the dialysis by hydrolysis of the non-caoutchouc constituents, e. g. by warming the latex or storing it for a time with alkali.

7. A process for the treatment of rubber latex according to claim 1, wherein a pressure of from 1 to 2 lbs. is maintained on the latex during dialysis to counteract dilution thereof.

8. A process for the purification of rubber latex consisting in removing by dialysis carbohydrates, salts and other crystalloid impurities held in solution, and in retarding or reversing the normal dilution of the latex during dialysis with or without hydrostatic pressure exerted on the body of the latex, by the employment on the side of the membrane opposite to the latex of an aqueous solution not capable of permeating the membrane and exerting an osmotic force opposed to that of the latex.

HENRY POTTER STEVENS.